US006501025B2

(12) United States Patent
Tilli et al.

(10) Patent No.: US 6,501,025 B2
(45) Date of Patent: *Dec. 31, 2002

(54) METHOD AND APPARATUS FOR BLOCKING FLUID AND FLUID VAPORS

(75) Inventors: George J. Tilli, Clinton Township, MI (US); Harold H. Zaima, Bloomfield Hills, MI (US); John Nye, Fort Gratiot, MI (US)

(73) Assignee: Clements Manufacturing L.L.C., Sterling Heights, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/433,669

(22) Filed: Nov. 4, 1999

(65) Prior Publication Data

US 2002/0153156 A1 Oct. 24, 2002

(51) Int. Cl.[7] ................................................ H01R 4/00
(52) U.S. Cl. ...................... 174/88 R; 174/151; 123/516
(58) Field of Search .............................. 174/84 R, 84 C, 174/88 R, 151, 152 G, 77 R, 153 G, 65 G; 123/509, 516

(56) References Cited

U.S. PATENT DOCUMENTS

| 3,636,501 | A | * | 1/1972 | Walsh .................. 174/84 C X |
| 4,012,282 | A | | 3/1977 | Hutter et al. |
| 4,061,344 | A | | 12/1977 | Bradley et al. |
| 4,104,484 | A | | 8/1978 | Ijlstra et al. |
| 4,107,456 | A | | 8/1978 | Schuster et al. |
| 4,213,004 | A | | 7/1980 | Acker et al. |
| 4,599,487 | A | | 7/1986 | Blank et al. |
| 4,626,721 | A | * | 12/1986 | Ouchi .................... 174/151 X |
| 4,745,239 | A | * | 5/1988 | Conrad ................. 174/84 C X |
| 4,959,508 | A | * | 9/1990 | McGrane ................. 174/84 C |
| 4,982,055 | A | | 1/1991 | Pollack et al. |
| 5,170,017 | A | * | 12/1992 | Stanevich et al. ...... 174/151 X |
| 5,183,698 | A | * | 2/1993 | Stephenson et al. ........ 428/209 |
| 5,194,697 | A | | 3/1993 | Hegner et al. |
| 5,406,032 | A | | 4/1995 | Clayton et al. |
| 5,596,176 | A | | 1/1997 | Everitt |
| 5,631,445 | A | | 5/1997 | Herster |
| 5,920,035 | A | * | 7/1999 | Haney et al. ........ 174/152 G X |
| 6,177,634 | B1 | * | 1/2001 | Smith ........................... 174/92 |
| 6,213,101 | B1 | * | 4/2001 | Numbers et al. ........... 123/516 |

* cited by examiner

Primary Examiner—Chau N. Nguyen
(74) Attorney, Agent, or Firm—Harness, Dickey & Pierce, PLC (57) ABSTRACT

A method and apparatus for blocking fluid and fluid vapors having a connecting member to connect a set of wires passing through bores formed in a plug body. Each wire having been cut, stripped of insulation and attached to the connecting member within the bores to create a consistent, solid barrier while maintaining the electrical integrity of the connection. The connection assembly and a portion of the insulation is then overmolded with an appropriate fluid resistant material or plastic resin which further interrupts and eliminates fluid leakage and fluid vapor migration.

24 Claims, 5 Drawing Sheets

_Figure - 7_

_Figure - 8_

_Figure - 9_

METHOD AND APPARATUS FOR BLOCKING FLUID AND FLUID VAPORS

BACKGROUND OF THE INVENTION

1. Technical Field

The present invention relates generally to a method and apparatus for blocking fluid and fluid vapors. More particularly, the present invention relates to a unique method and construction of an apparatus for preventing fluid leakage and vapor migration through the use of connecting devices.

2. Discussion

Conventional automotive fuel delivery systems utilize an electric fuel pump mounted in a fuel tank to deliver fuel from the fuel tank to the engine. Power is supplied to the fuel pump through electric wires connected between the fuel pump and a voltage source such as an alternator or a vehicle battery. In order to reach the fuel pump, the electrical wires must pass through an opening in the fuel tank. Such an opening, unless properly sealed, potentially provides a pathway for fluid leakage and fluid vapor migration commonly referred to as vapor permeation. Minimizing such fluid leakage and vapor permeation is desirable due to increasing regulations regarding automotive fuel vapor emissions and overall product efficiency.

Several attempts to seal this opening in the fuel tank have been developed. Many of these contributions to the art include a fitting adapted for placement in the opening. The electrical wires then continuously pass through this fitting. Although the wires are fitted together as tightly as possible through the fitting, spaces or pores inevitably exist through which fluid leakage and vapor permeation is released.

In other contributions to the art, fluid leakage and vapor permeation is attempted to be prevented through the use of numerous continuous wires, the center portions of which are stripped of insulation. A plug is then placed over the exposed center insulation stripped wire portion. The entire composite is then blocked through a chemical bath treatment. Such contributions typically include production processes which are laborious and expensive, further possibly requiring separate internal and external harnesses. Moreover, the use of insulated continuous wire is rather costly and wasteful since this high end type of wire is only required in the area inside the fuel tank and not throughout the entire vehicle. Wires in the fuel tank are typically specially cured such as through chemical baths or through exposure to radiation to strengthen their various necessary attributes. This greatly increases the cost of the wires.

As set forth above, in order to maintain the electrical integrity of the connection, the electrical wires are typically wrapped with expensive insulation. Some such wire insulation swells when exposed to fluid or vapor permeation which may cause cracking and/or breakage. Other types of insulation shrink when exposed to fluid or vapor permeation, thus increasing the size of the pathway through which fluid leakage or vapor permeation may escape. When the insulation on the wires passing through a fitting deteriorates due to shrinking or swelling, or when the wires are not sufficiently bound to the fitting, the area between the wire and the fitting are widened providing a greater pathway through which fluid leakage or vapor permeation may be released.

In other processes, the center of the conductors is stripped and through a vacuum process, a fuel resistant sealant is introduced to fill the pores between the wires and the fitting. Such a contribution is illustrated in U.S. Pat. No. 5,631,445 (Herster). A welded or bonded section of wire has also been developed to prevent fluid leakage and vapor permeation. New wire is also being developed which includes a blocking agent added during the extrusion process.

The current contributions to the art do not effectively and consistently compensate for the problems set forth above, in part by failing to adequately seal and close the space between the wires and the fitting, by failing to sufficiently bond the wires to the fitting, and by failing to adequately and consistently seal the wires while maintaining the electrical integrity of the connection. In order to overcome the problems associated with the current contributions to the art, various designs and methods for blocking fluid and fluid vapors have been developed. The continued development has been directed to designs which simplify the manufacturing process and assembly while keeping costs at a minimum and performance at a maximum.

SUMMARY OF THE INVENTION

It is a principal object of the present invention to provide a method and apparatus for blocking fluid and fluid vapors which consistently eliminates the minute pathways from which fluid leakage and vapor permeation may escape. The term "fluid" will be used throughout, however, it will be appreciated that this term includes both fluid and fluid vapors.

A related object of the present invention is to provide a method and apparatus for blocking fluid and fluid vapors which allows for the use of a solid wire inside the fuel tank and a more cost effective wire outside the fuel tank.

It is another object of the present invention to provide a method and apparatus for blocking fluid and fluid vapors which includes connecting two separate wires together through the use of a connecting member, wherein a consistent, solid barrier is created while maintaining the electrical integrity of the connection. This entire connection is then overmolded with an appropriate fluid resistant material such as a plastic resin material from the acetyl family for fuel applications.

It is still yet another object of the present invention to provide a method and apparatus for blocking fluid and fluid vapors which is inexpensive to manufacture, compatible with automation and easy to install.

It is another object of the present invention to provide a method and apparatus for blocking fluid and fluid vapors which does not require the laborious and costly process of dipping the wires into a chemical bath and/or the use of the vacuum process.

It is another object of the present invention to provide a method and apparatus for blocking fluid and fluid vapors that utilizes a more costly, fluid resistant automotive grade wire inside the fuel tank and a more cost effective automotive grade wire outside the fuel tank.

In one form, the present invention provides a method for blocking fluid and fluid vapors including a connecting member. The method of the present invention includes the general steps of cutting an electrical wire and stripping the wire of its insulation at the cut ends. The wires are then attached onto the connecting member so as to maintain the electrical integrity of the connection. Finally, this connection, plus a portion of the wire insulation is overmolded with an appropriate fluid resistant material.

In another form, the present invention provides an apparatus for blocking fluid and fluid vapors including a connecting member and electrical wires which are cut and stripped of their insulation at the cut ends. The wires are then attached onto the connecting member so as to maintain the electrical integrity of the connection. The connection, plus a portion of the wire insulation, is then overmolded with an appropriate fluid resistant material.

Other advantages, benefits and objects of the present invention will become apparent to those skilled in the art from a reading of the subsequent detailed description, appended claims and accompanying drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
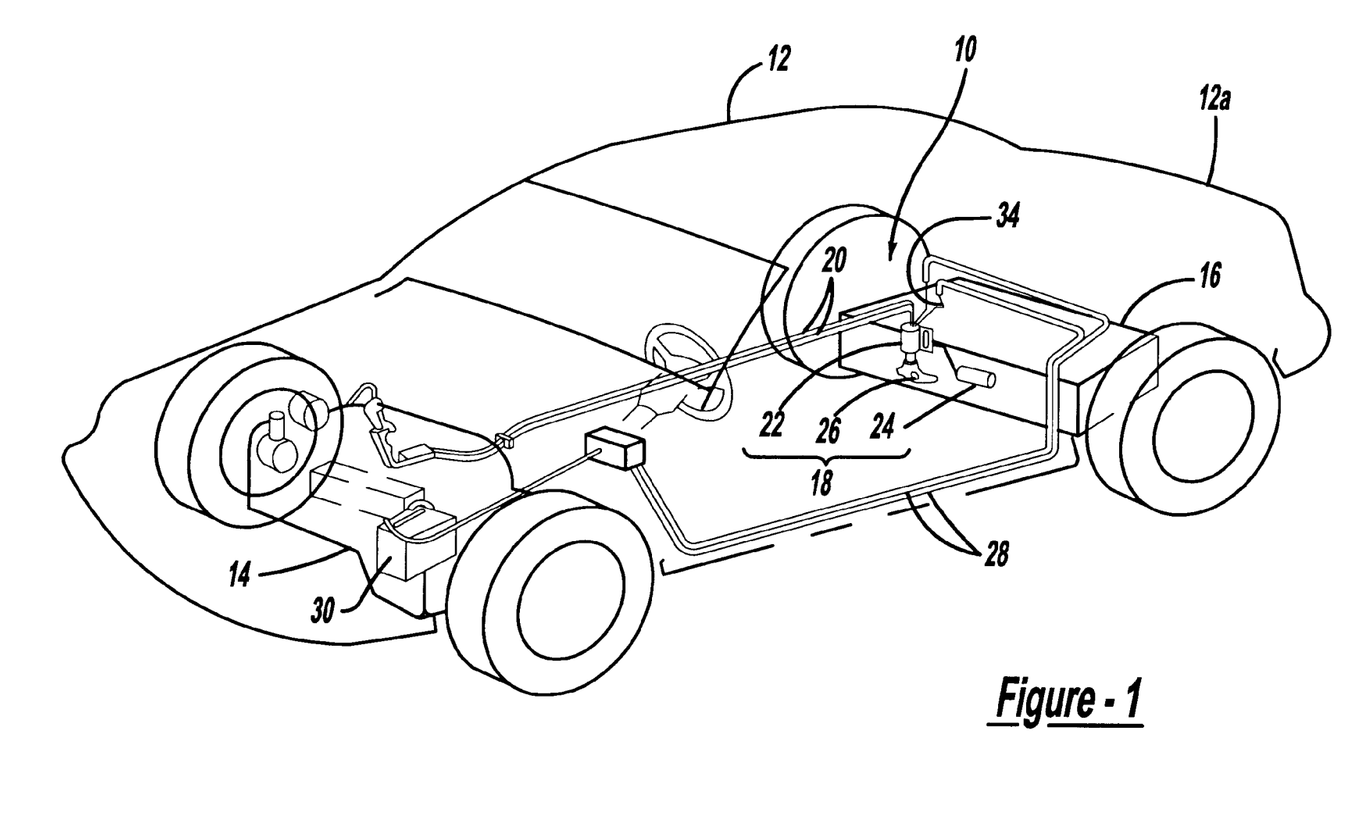
FIG. 1 is an environmental view of a method and apparatus for blocking fluid and fluid vapors constructed in accordance with the teachings of a preferred embodiment of the present invention shown incorporated into a motor vehicle, the remainder of the vehicle is shown in phantom lines.

Referring now to the drawings in which like reference numerals designate like or corresponding parts throughout the several views, there is depicted an apparatus for blocking fluid and fluid vapors embodying the concepts of the present invention. The apparatus of the present invention is generally identified in the drawings with reference numeral 10 and is shown in FIG. 1 adapted to cooperate with a specific fuel delivery system of a motor vehicle 12. However, the teachings of the present invention are more broadly applicable to other transportation applications including, but not limited to, motor vehicles, airlines, trains, recreational vehicle and marine applications, etc., where fluid leakage and/or vapor migration prevention is desirable (i.e., transmission harnesses).

Prior to addressing the construction and operation of the apparatus 10 of the present invention, a brief understanding of the exemplary fuel delivery system of the motor vehicle 12 shown in FIG. 1 is warranted. The environmental view of FIG. 1 illustrates the apparatus 10 operatively attached to a fuel delivery system of the vehicle 12. The fuel delivery system provides fuel to an engine 14 and includes a fuel tank 16 located in a rear section 12a of the vehicle 12 in which a fuel delivery module 18 is mounted in any commonly known manner. The fuel delivery system also includes a pair of fuel lines 20, one for delivering fuel from the fuel tank 16 to the engine 14 and the other for returning fuel from the engine 14 to the fuel tank 16. Fuel delivery module 18, which is mounted to the fuel tank 16, has an electric fuel pump 22 connected to one of the fuel lines 20, a pump sender 24 for signaling the fuel level within the fuel tank 16, and a fuel filter 26 on an inlet side of the electric fuel pump 22. Electrical wires 28 pass through the fuel tank 16 to supply the electric fuel pump 22 and the pump sender 24 with electrical power from a battery 30. A plug body 34 according to the present invention provides a sealed conduit for the electrical wires 28 to pass through the fuel tank 16 while minimizing fluid leakage and vapor permeation therefrom. As will be understood by those skilled in the art, FIG. 1 is for illustrative purposes only and not meant to indicate a specific vehicle or fuel delivery system, and is but one adaptation for which the present invention can appropriately be used.

Figure 2:
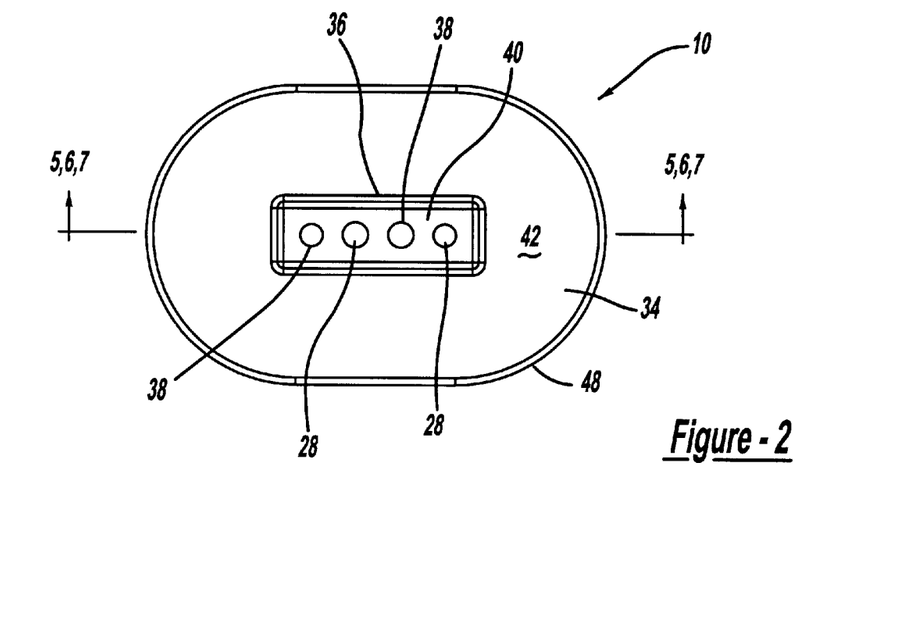
FIG. 2 is a top view of the method and apparatus for blocking fluid and fluid vapors shown in FIG. 1.
Figure 5:
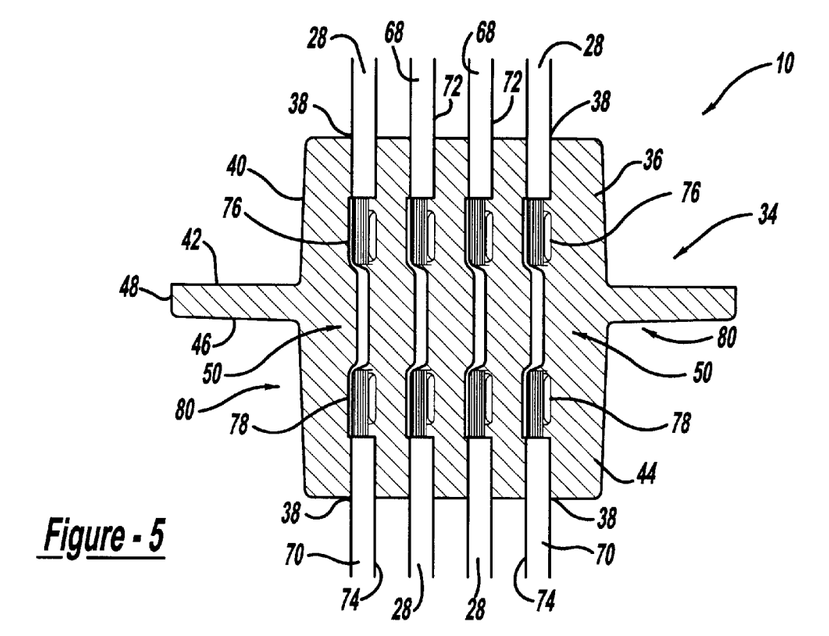
FIG. 5 is a sectional view taken along the line 5—5 of FIG. 2 illustrating a method and apparatus for blocking fluid and fluid vapors constructed in accordance with the teachings of a preferred embodiment of the present invention, including the connecting member shown in FIGS. 3 and 4.

Referring now to FIG. 2 and FIG. 5, the apparatus for blocking fluid and fluid vapors 10 is shown including the plug body 34. The plug body 34 includes an enlarged central portion 36 having a plurality of bores 38 formed therethrough. The enlarged central portion 36 is preferably integrally formed with the plug body 34, and includes an upwardly projecting portion 40 projecting upward from a top surface 42 and a downwardly projecting portion 44 projecting downward from a bottom surface 46. The plug body 34 is fitted into an opening in the fuel tank 16 and is welded to the fuel tank 16 in such a manner that the downwardly projecting portion 44 of the enlarged central portion 36 extends downward into the fuel tank 16. The plug body 34 is fitted into the opening in the fuel tank 16 such that a perimeter portion 48 of the plug body 34 is welded over the opening in the fuel tank 16. Alternatively, the plug body 34 is fitted into a flange member wherein the entire assembly is then fitted onto the fuel tank 16.

Figures 3, 4:
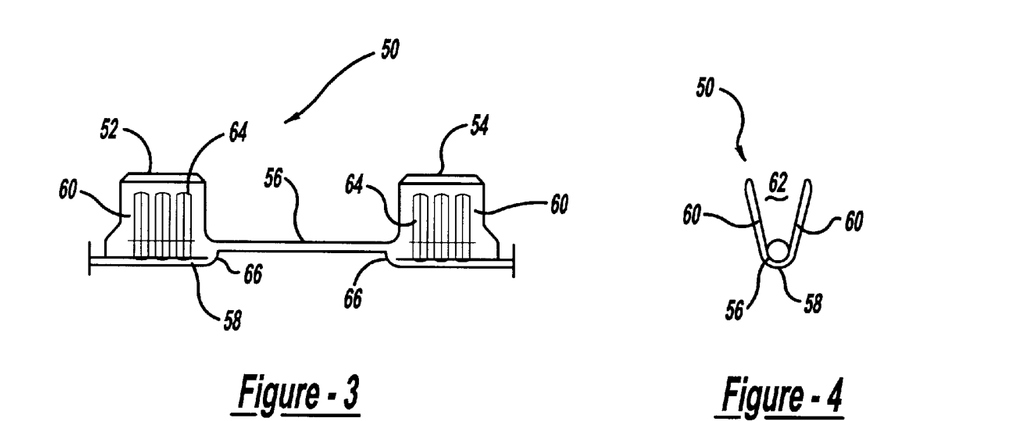
FIG. 3 is a side elevation view of a connecting member constructed in accordance with the teachings of a preferred embodiment of the present invention.
FIG. 4 is an end elevation view of the connecting member shown in FIG. 3.

There is shown in FIG. 3 and FIG. 4, an electrical connecting device according to the present invention which is designated generally by reference number 50. The electrical connecting device is made from a single or multiple piece of stamped metal, preferably brass, copper, beryllium or optionally plated with various metals, and includes wire retaining sections 52 and 54, and an intermediate section 56 disposed between the wire retaining section 52 and the wire retaining section 54. A base 58 is common to and forms the supporting member for wire retaining section 52, intermediate section 56 and wire retaining section 54.

Wire retaining sections 52 and 54 are adapted to secure an appropriate lead wire (not shown) by crimping onto a bare wire portion of the lead wire. A pair of wings 60 extend from the base 58 and are bent generally vertical to the base 58 to form a generally U-shaped receptacle 62 for accepting the bare wire portion of the lead wire. A series of ribs 64 may be formed into the wings 60 and the base 58 in the area of wings 60 to enhance both contact with and the retention of the bare wire portion of the lead wire. After placement of the bare wire portion of the lead wire within the U-shaped receptacle 62 formed by the pair of wings 60, the wings 60 are crimped over on top of the base 58 by an appropriate tool to retain the bare wire portion of the lead wire by sandwiching the bare wire portion of the lead wire between the base 58 and the wings 60. During the crimping operation, ribs 64 are crimped into the bare wire portion of the lead wire. A stepped section 66 is formed in the base 58 to accommodate for the thickness of the insulation in order to present a generally conforming surface on the base 58 for the lead wire to contact. While the above describes a mechanical connection between the electrical connecting device and the lead wire through crimping, it will be appreciated that any commonly known connecting, bonding or adhering means may be utilized including, but not limited to, soldering, welding, gluing or an insulation displacement connection.

With continued reference to FIG. 5, the electrical wires 28 along with the electrical connecting device 50 pass through the bores 38 formed in the enlarged central portion 36 of the plug body 34. The electrical wires 28 include a first wire 68 and a second wire 70. The first wire 68 is located outside the fuel tank 16 (shown in FIG. 1) and is typically a more cost effective automotive grade wire commonly known in the industry, or a stranded electrical wire, or a solid electrical wire. The second wire 70 is located inside the fuel tank 16 and is typically specially cured such as through chemical baths or through exposure to radiation to strengthen its various necessary attributes, or a stranded electrical wire, or a solid electrical wire. The first wire 68 and the second wire 70 have insulation 72 and 74, respectively, thereon to secure the electrical integrity of the connection and prevent short circuits as is commonly known. Preferably, the insulation 74 of the second wire 70 is fuel resistant, for example, a moisture cured or irradiated, high density polyethylene insulation, which swells only minimally when exposed to fuel so as to prevent cracking and breaking of the insulation 74 of the second wire 70 located inside the fuel tank 16. In some instances, the second wire 70 having fuel resistant insulation 74 secured thereon may be used not only inside the fuel tank 16 but also outside the fuel tank 16 as well. In such instances, the wire is cut into two pieces prior to its placement within the electrical connecting device 50 and thereafter in the bores 38 formed in the enlarged central portion 36 of the plug body 34.

As illustrated in FIG. 5, the first wire 68 and the second wire 70 have end portions 76 and 78, respectively. The end portions 76 and 78, along with the electrical connecting device 50, are encased within the plug body 34. The insulation 72 of the first wire 68 is stripped at the end portion 76. Likewise, the insulation 74 of the second wire 70 is stripped at the end portion 78. The stripped end portion 76 of the first wire 68 and the stripped end portion 78 of the second wire 70 are then attached to the electrical connecting device as described above. The wire retaining sections 52 and 54 are designed to receive the end portions 76 and 78 of the electrical wires 28. In instances where one contiguous piece of wire is utilized, which has been cut into two pieces prior to placement within the electrical connecting device 50 and thereafter in the bores 38, each end portion is similarly stripped of its insulation and then attached to the electrical connecting device as previously described. This process thus creates a consistent, solid barrier which eliminates pathways for fluid leakage and vapor permeation while maintaining the electrical integrity of the connection.

Figure 5A:
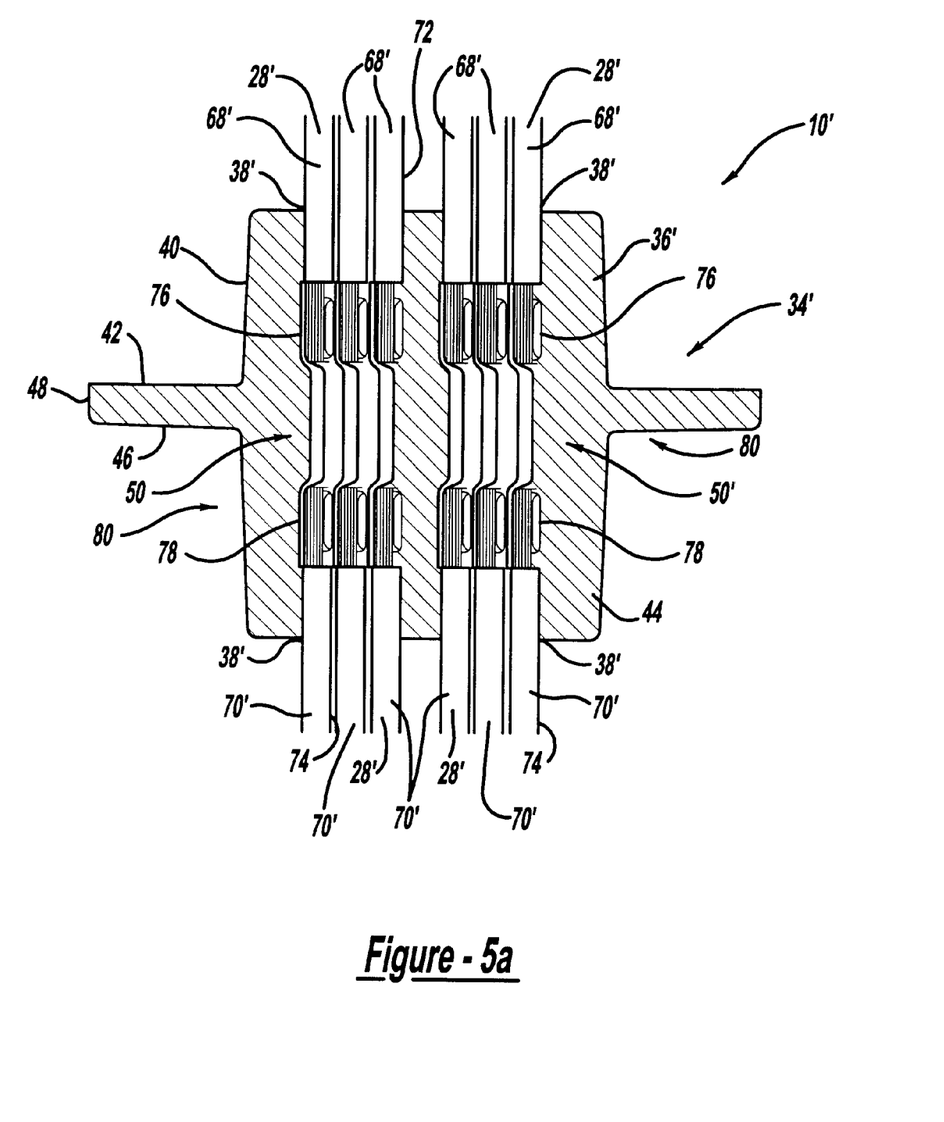
FIG. 5A is a sectional view taken along the line 5—5 of FIG. 2 illustrating a method and apparatus for blocking fluid and fluid vapors constructed in accordance with the teachings of an alternative embodiment of the present invention, including the connecting member shown in FIGS. 3 and 4.

Following the connecting process, the electrical connecting device 50, plus a portion of the insulation 72 of the first wire 68 and a portion of the insulation 74 of the second wire 70 are overmolded with an appropriate fluid resistant material or plastic resin, by way of example, in the acetyl family, to form an overmolded section 80. Accordingly, the overmold covers and bonds together a portion of the insulation 72 of the first wire 68, a portion of the insulation 74 of the second wire 70, and the electrical connecting device 50. Thus further interrupting and eliminating any pathways for fluid leakage and vapor permeation. An alternative embodiment of a method and apparatus for blocking fluid and fluid vapors 10' is illustrated in FIG. 5A. The method and apparatus for blocking fluid and fluid vapors 10' differs primarily from the previous embodiment 10 in that a plurality of electrical wires 28' pass through the bores 38' formed in enlarged central portion 36' of plug body 34'. Like reference numbers will be used to describe like components. As illustrated in FIG. 5A, a plurality of first electrical wires 68' and a plurality of second electrical wires 70' are each connected to a plurality of electrical connecting devices 50' which together pass through bores 38' formed in enlarged central portion 36' of plug body 34'.

Figure 6:
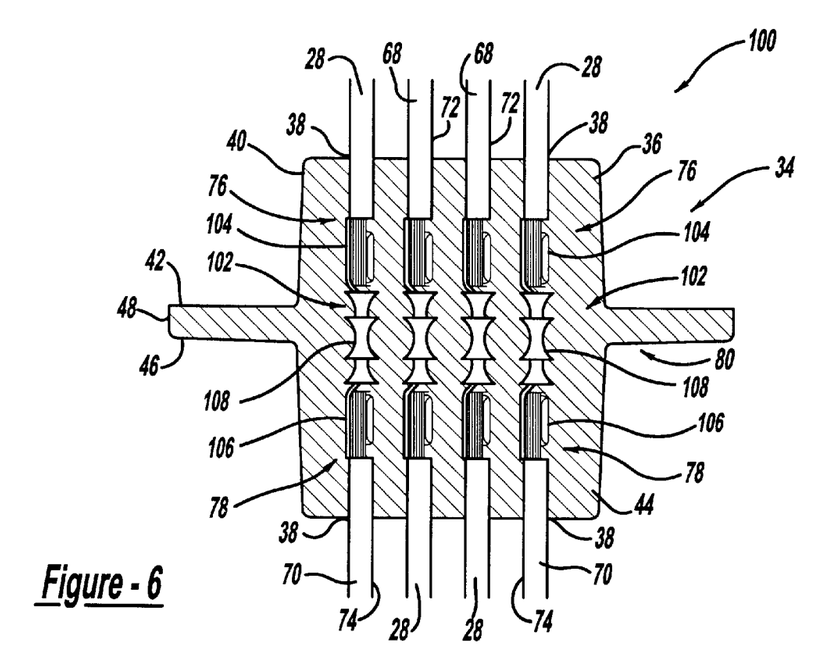
FIG. 6 is a sectional view taken along the line 6—6 of FIG. 2 illustrating a method and apparatus for blocking fluid and fluid vapors constructed in accordance with the teachings of a second preferred embodiment of the present invention.

An alternative embodiment of a method and apparatus for blocking fluid and fluid vapors 100 is illustrated in FIG. 6. The method and apparatus for blocking fluid and fluid vapors 100 differs primarily from the previous embodiment 10 in the shape and general configuration of the electrical connecting device. In the method and apparatus for blocking fluid and fluid vapors 100, like reference numbers will be used to describe like components. As illustrated in FIG. 6, the method and apparatus for blocking fluid and fluid vapors 100 includes an electrical connecting device 102. The electrical connecting device 102 includes wire retaining sections 104 and 106, and an intermediate section 108 disposed between the wire retaining section 104 and the wire retaining section 106. The wire retaining sections 104 and 106 are designed to receive the end portions 76 and 78 of the electrical wires 28. The intermediate section 108 of the electrical connecting device 102 is geometrically designed, such as serrated, to create a tortuous path of travel for any potential fluid leakage and vapor permeation. The method and apparatus for blocking fluid and fluid vapors 100 thereby further interrupts and eliminates any pathways for fluid leakage and vapor permeation while maintaining the electrical integrity of the connection. It is appreciated that the intermediate section 108 of the electrical connecting device 102 can be of any commonly known geometric shape which would provide such a tortuous path of travel. As illustrated in FIG. 6, the intermediate section 108 of the electrical connecting device 102 is generally in the shape of a series of horns.

Figure 7:
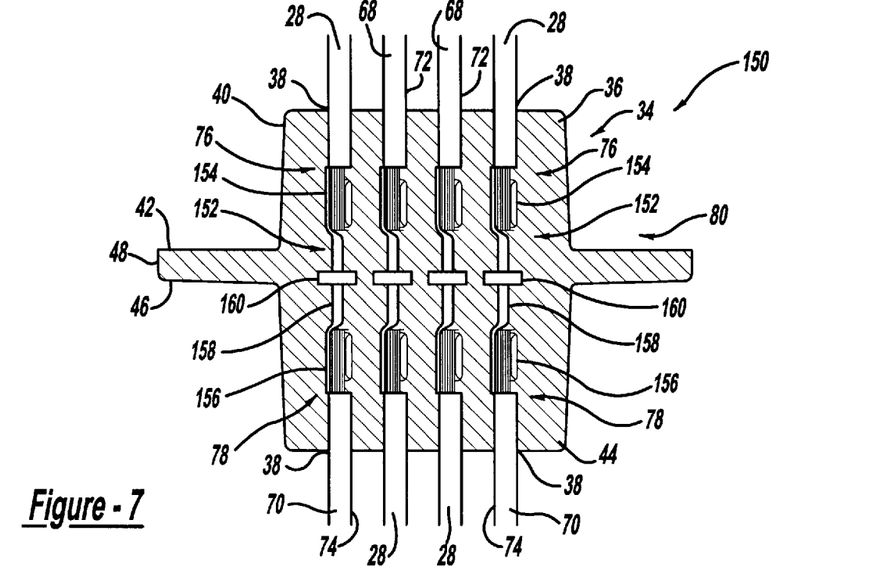
FIG. 7 is a sectional view taken along the line 7—7 of FIG. 2 illustrating a method and apparatus for blocking fluid and fluid vapors constructed in accordance with the teachings of a third preferred embodiment of the present invention.

A second alternative embodiment of a method and apparatus for blocking fluid and fluid vapors 150 is illustrated in FIG. 7. In the method and apparatus for blocking fluid and fluid vapors 150, like reference numbers will be used to describe like components. The method and apparatus for blocking fluid and fluid vapors 150 includes an electrical connecting device 152. The electrical connecting device 152 includes wire retaining sections 154 and 156, an intermediate section 158 disposed between the wire retaining section 154 and the wire retaining section 156, and a washer 160. The wire retaining sections 154 and 156 are designed to receive the end portions 76 and 78 of the electrical wires 28. The washer 160 is located on, is perpendicular to and completely surrounds the intermediate section 158, thus creating an additional barrier for any potential fluid leakage and vapor permeation. The method and apparatus for blocking fluid and fluid vapors 150 thereby further interrupts and eliminates any pathways for fluid leakage and vapor permeation while maintaining the electrical integrity of the connection.

Figure 8:
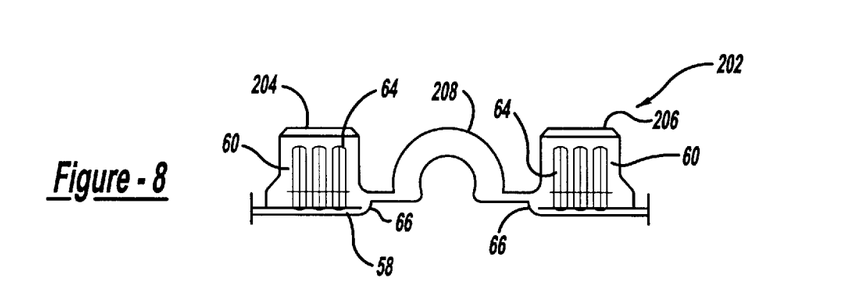
FIG. 8 is a side elevational view of a connecting member constructed in accordance with the teachings of a fourth preferred embodiment of the present invention.

Another alternative embodiment of an electrical connecting device 202 is illustrated in FIG. 8. In the electrical connecting device 202, like reference numbers will be used to describe like components. The electrical connecting device 202 includes wire retaining sections 204 and 206, and an intermediate section 208 disposed between the wire retaining section 204 and the wire retaining section 206. The wire retaining sections 204 and 206 are designed to receive the end portions 76 and 78 of the electrical wires 28. The intermediate section 208 of the electrical connecting device 202 is half circular in shape thus creating a tortuous path of travel for any potential fluid leakage and vapor permeation. The electrical connecting device 202 thereby aids in further interrupting and eliminating any pathways for fluid leakage and vapor permeation while maintaining the electrical integrity of the connection. Similar to the method and apparatus for blocking fluid and fluid vapors 100, it is appreciated that the intermediate section 208 of the electrical connecting device 202 can be of any commonly known geometric shape which would provide such a tortuous path of travel.

Figure 9:
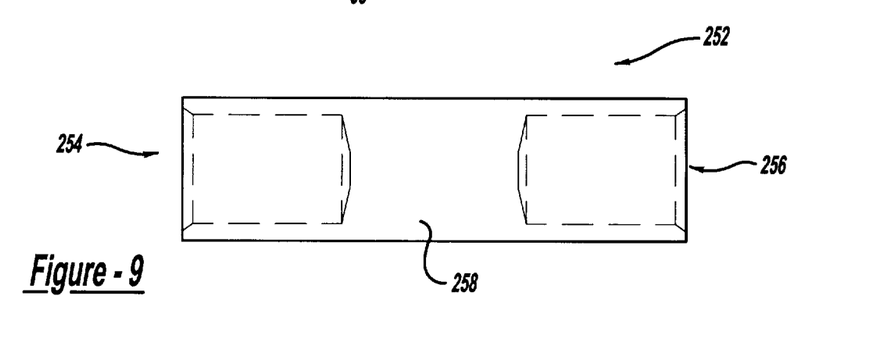
FIG. 9 is a side elevational view of a connecting member constructed in accordance with the teachings of a fifth preferred embodiment of the present invention.

In another alternative embodiment, as illustrated in FIG. 9, a junction connector 252 is utilized rather than electrical connecting devices 50, 102, 152 or 202. The junction connector 252 includes wire retaining sections 254 and 256, and an intermediate section 258 disposed between the wire retaining section 254 and the wire retaining section 256. The wire retaining sections 254 and 256 are designed to receive the end portions 76 and 78 of the electrical wires 28. Similar to the electrical connecting devices 50, 102, 152 and 202, the junction connector 252 aids in further interrupting and eliminating any pathways for fluid leakage and vapor permeation while maintaining the electrical integrity of the connection.

The method and apparatus for blocking fluid and fluid vapors 10, 100 and 150, as well as the electrical connecting device 202 and the junction connector 252, as described above, all provide a sealed closure which prevents fluid leakage and vapor permeation while maintaining electrical integrity and also affording greater cost benefits by utilizing more costly wire only where needed.

While the above detailed description describes the preferred embodiment of the present invention, it should be understood and appreciated that the invention is susceptible to modification, variation and alteration without departing from the proper scope and fair meaning of the accompanying claims.

What is claimed is:

1. In a motor vehicle having a fuel delivery system including an electric fuel pump mounted in a fuel tank, the improvement comprising an apparatus for blocking fluid and fluid vapors including:

a plug body adapted to be fitted into the fuel tank having at least one bore formed therethrough;

a first electrical wire extending into said at least one bore formed in said plug body;

a second electrical wire extending into said at least one bore formed in said plug body; and means for electrically connecting said first electrical wire and said second electrical wire together, said means for electrically connecting said wires being encased in said plug body and having a desired configuration to create a path of travel for potential fluid leakage and fluid vapor such that fluid leakage and fluid vapor migration is eliminated.

2. The apparatus for blocking fluid and fluid vapors of claim 1, wherein said first electrical wire includes an automotive grade wire and said second electrical wire includes a fluid resistant wire.

3. The apparatus for blocking fluid and fluid vapors of claim 2, wherein said means for electrically connecting comprises an electrical connecting member, said electrical connecting member including:

a first wire retaining section;

a second wire retaining section; and an intermediate section disposed between said first wire retaining section and said second wire retaining section, wherein said electrical connecting member is attached onto said first electrical wire at said first wire retaining section and is attached onto said second electrical wire at said second wire retaining section.

4. The apparatus for blocking fluid and fluid vapors of claim 3, wherein said intermediate section of said connecting member is serrated.

5. The apparatus for blocking fluid and fluid vapors of claim 3, wherein said intermediate section of said connecting member is semi-circular in shape.

6. The apparatus for blocking fluid and fluid vapors of claim 3, wherein said connecting member further includes a washer adapted to be disposed on said intermediate section.

7. The apparatus for blocking fluid and fluid vapors of claim 3, further comprising an overmolded section, wherein said electrical connecting member, said first electrical wire and said second electrical wire are overmolded together to form said overmolded section.

8. The apparatus for blocking fluid and fluid vapors of claim 7, wherein said overmolded section is overmolded with a fluid resistant plastic resin.

9. An apparatus for blocking fluid and fluid vapors comprising:

a plug body having a plurality of bores formed therethrough;

a plurality of first electrical wires extending into one of said corresponding plurality of bores formed in said plug body;

a plurality of second electrical wires extending into one of said corresponding plurality of bores formed in said plug body; and a plurality of electrical connecting members used for electrically connecting each of said plurality of first electrical wires and each of said plurality of second electrical wires together, said plurality of electrical connecting members connecting said wires being encased in said plug body having a desired configuration to create a path of travel for potential fluid leakage and fluid vapor such that fluid leakage and fluid vapor migration is prohibited.

10. The apparatus for blocking fluid and fluid vapors of claim 9, wherein said plurality of first electrical wires comprise an automotive grade wire and said plurality of second electrical wires comprise a fluid resistant wire.

11. The apparatus for blocking fluid and fluid vapors of claim 10, wherein said electrical connecting members comprise:

a first wire retaining section;

a second wire retaining section; and an intermediate section disposed between said first wire retaining section and said second wire retaining section, wherein said electrical connecting members are attached onto each of said plurality of first electrical wires at said first wire retaining section and are attached onto each of said plurality of second electrical wires at said second wire retaining section.

12. The apparatus for blocking fluid and fluid vapors of claim 11, wherein said intermediate section of said connecting members is serrated.

13. The apparatus for blocking fluid and fluid vapors of claim 11, wherein said intermediate section of said connecting members is semi-circular in shape.

14. The apparatus for blocking fluid and fluid vapors of claim 11, wherein said connecting members further include a washer adapted to be disposed on said intermediate section.

15. The apparatus for blocking fluid and fluid vapors of claim 11, further comprising an overmolded section, wherein each of said plurality of connecting members, each of said plurality of first electrical wires and each of said plurality of second electrical wires are overmolded together to form said overmolded section.

16. The apparatus for blocking fluid and fluid vapors of claim 15, wherein said overmolded section is overmolded with a fluid resistant plastic resin.

17. A method of blocking fluid and fluid vapors, the method comprising the steps of:

providing a plug body having a plurality of bores formed therethrough;

extending at least one of a plurality of first electrical wires into one of said corresponding plurality of bores formed in said plug body;

extending at least one of a plurality of second electrical wires into one of said corresponding plurality of bores formed in said plug body; and electrically connecting each of said plurality of first electrical wires and each of said plurality of second electrical wires together; and forming a path of travel between said first and second plurality of electrical wires for potential fluid leakage and fluid vapor such that fluid leakage and fluid vapor migration is prohibited.

18. The method of blocking fluid and fluid vapors of claim 17, wherein said plurality of first electrical wires comprise an automotive grade wire and said plurality of second electrical wires comprise a fluid resistant wire.

19. The method of blocking fluid and fluid vapors of claim 18, wherein the step of electrically connecting comprises:

providing a plurality of electrical connecting members, each having a first wire retaining section, a second wire retaining section and an intermediate section disposed between said first wire retaining section and said second wire retaining section;

connecting each of said plurality of first electrical wires to said first wire retaining section of one of said plurality of electrical connecting members; and connecting each of said plurality of second electrical wires to said second wire retaining section of one of said plurality of electrical connecting members.

20. The method of blocking fluid and fluid vapors of claim 19, wherein said intermediate section of said connecting members is serrated.

21. The method of blocking fluid and fluid vapors of claim 19, wherein said intermediate section of said connecting members is semi-circular in shape.

22. The method of blocking fluid and fluid vapors of claim 19, wherein said connecting members further include a washer adapted to be disposed on said intermediate section.

23. The method of blocking fluid and fluid vapors of claim 19, further comprising overmolding each of said plurality of electrical connecting members, each of said plurality of first electrical wires and each of said plurality of second electrical wires together to form an overmolded section.

24. The method of blocking fluid and fluid vapors of claim 23, wherein said overmolded section is overmolded with a fluid resistant plastic resin.

* * * * *